United States Patent
Siadatnasab et al.

(10) Patent No.: US 10,843,175 B2
(45) Date of Patent: Nov. 24, 2020

(54) COMPOSITION AND METHOD FOR TREATING DYE WASTEWATER

(71) Applicants: Firouzeh Siadatnasab, Boushehr (IR); Saeed Farhadi, Khoramabad (IR); Akram-Alsadat Hoseini, Tehran (IR)

(72) Inventors: Firouzeh Siadatnasab, Boushehr (IR); Saeed Farhadi, Khoramabad (IR); Akram-Alsadat Hoseini, Tehran (IR)

(*) Notice: Subject to any disclaimer, the term of this patent is extended or adjusted under 35 U.S.C. 154(b) by 413 days.

(21) Appl. No.: 15/991,554

(22) Filed: May 29, 2018

(65) Prior Publication Data

US 2019/0366308 A1 Dec. 5, 2019

(51) Int. Cl.
| | |
|---|---|
| *B01J 27/04* | (2006.01) |
| *B01J 23/745* | (2006.01) |
| *B01J 23/75* | (2006.01) |
| *B01J 37/04* | (2006.01) |
| *B01J 37/10* | (2006.01) |
| *C02F 1/36* | (2006.01) |
| *C02F 1/68* | (2006.01) |
| *C02F 1/72* | (2006.01) |
| *B01J 37/34* | (2006.01) |
| *B82Y 30/00* | (2011.01) |
| *C02F 101/30* | (2006.01) |

(52) U.S. Cl.
CPC .............. *B01J 27/04* (2013.01); *B01J 23/745* (2013.01); *B01J 23/75* (2013.01); *B01J 37/04* (2013.01); *B01J 37/10* (2013.01); *B01J 37/343* (2013.01); *C02F 1/36* (2013.01); *C02F 1/68* (2013.01); *C02F 1/722* (2013.01); *B82Y 30/00* (2013.01); *C02F 2101/308* (2013.01); *C02F 2305/08* (2013.01)

(58) Field of Classification Search
CPC . B01J 27/04; B01J 23/745; B01J 23/75; B01J 37/04; B01J 37/10; B01J 37/343; C02F 1/36; C02F 1/68; C02F 1/722
See application file for complete search history.

(56) References Cited

FOREIGN PATENT DOCUMENTS

| | | | |
|---|---|---|---|
| CN | 106082303 A | * | 11/2016 |
| CN | 105399197 B | * | 1/2018 |

* cited by examiner

*Primary Examiner* — James A Fiorito

(57) ABSTRACT

A composition for treating dye wastewater and method of synthesizing said composition, is disclosed. The composition is a catalyst composition used for ultrasound irradiation process. The composition comprises a copper sulfide and cobalt ferrite ($Cu_2S/CoFe_2O_4$) nanocomposite material, and hydrogen peroxide ($H_2O_2$). Further, the present invention also discloses a method for treating dye wastewater using said nanocomposite catalyst composition. The composition according to the present invention, provides a novel, eco-friendly and economical method for the complete degradation of the organic dye pollutants from the industrial wastewater. Further, the sonocatalyst has enough stability, as its structure and degradation ability does not change even after multiple use. Further, the sonocatalyst could be easily separated and reused from a waste water, without any need for complex separation process.

6 Claims, 14 Drawing Sheets

COMPOSITION AND METHOD FOR TREATING DYE WASTEWATER

BACKGROUND OF THE INVENTION

Recent growth of paper, textile, leather, dyeing/printing and plastic industries and presence of dyes in their waste effluents is a major concern due to related environmental hazards. It is estimated that more than 100,000 commercially available dyes with over $7 \times 10^5$ tonnes of dyestuff produced annually. The above industries cause discharge of dyes in the environment and generate a considerable amount of dye wastewater.

Many organic dyes are toxic/carcinogenic in nature and show resistant to degradation due to high stability towards light and oxidation. The presence of even very small amounts of dyes in water is visible and undesirable. For example, exposure to basic dyes like methylene blue (MB), commonly used for dying of cotton, wood and silk or methyl orange (MO, widely used in textile, printing, paper, food and pharmaceutical industries, research laboratories etc.) causes eye burns, breathing difficulties, burning sensation, nausea, vomiting, profuse sweating, mental confusion and methemoglobinemia.

In the past, several methods have been adopted for the removal of dyes from wastewater, including for example, photocatalytic degradation, cation exchange membranes, electrochemical degradation, adsorption/precipitation processes. Although viable dye removal process to an extent, these existing processes are limited by disadvantages including energy cost, secondary pollution and safety of operation.

Therefore, there exists a need for a novel composition and an efficient process for treating dye effluents or pollutants. There is also need for a composition that consumes less time, energy and allows easy retrieval of the catalyst from reaction mixture for subsequent uses.

SUMMARY OF THE INVENTION

In an aspect of the present invention, a composition for treating dye wastewater, is disclosed. In one embodiment, the composition is a catalyst composition used for ultrasound irradiation process. The composition according to the present invention, comprises a copper sulfide and cobalt ferrite ($Cu_2S/CoFe_2O_4$) nanocomposite material. In one embodiment, the composition further comprises hydrogen peroxide ($H_2O_2$). In one embodiment, the coercive force ($H_c$) of the nanocomposite material is 480 Oe. The saturation magnetization ($M_s$) of the nanocomposite material is 36.26 emu/g. Further, the remnant magnetization ($M_r$) of the nanocomposite material is 9.85 emu/g. In one embodiment, the nanocomposite material is a sonocatalyst. In one embodiment, the concentration of hydrogen peroxide ($H_2O_2$) ranges from 0 mM to 5 mM. In some embodiments, the optimum concentration of hydrogen peroxide ($H_2O_2$) is 4 mM.

According to another aspect of the present invention, a method of synthesizing a composition for treating dye wastewater, is disclosed. The method comprises the step of: (a) preparing copper sulfide ($Cu_2S$) nanoparticle by heating Cu(II) diethyldithiocarbamate complex at predetermined time and temperature, (b) adding $Cu_2S$ nanoparticle in deionized water and sonicating them together for preset time to form a suspension, (c) adding predetermined quantity of $Fe(NO_3)_3 \cdot 9H_2O$ and $Co(NO_3)_2 \cdot 6H_2O$ to said suspension and agitate for preset time, (d) adding NaOH solution and stir with resultant solution of step (c) to obtain pH 11, (e) heating the resultant solution of step (d) for predetermined time and temperature, and (f) cooling the output nanoparticles of step (e) to room temperature, washing and filtering to obtain the sonocatalyst copper sulfide and cobalt ferrite ($Cu_2S/CoFe_2O_4$) nanocomposite material.

In one embodiment, the predetermined temperature for preparing copper sulfide ($Cu_2S$) nanoparticle at step (a) is 220° C. The predetermined time for preparing copper sulfide ($Cu_2S$) nanoparticle at step (a) is 0.5 h. Further, the $Cu_2S$ nanoparticle is sonicated in deionized water at step (b) for 1 h. In one embodiment, the predetermined quantity of $Fe(NO_3)_3 \cdot 9H_2O$ and $Co(NO_3)_2 \cdot 6H_2O$ is agitated with said suspension at step (c) for 1 h. In one embodiment, the resultant solution of step (d) is heated in autoclave at 180° C. for 12 h.

According to another aspect of the present invention, a method of treating dye wastewater, comprising the steps of: (a) pre-sonicating the dye wastewater with a sonocatalyst composition; (b) irradiating the pre-sonicated solution in presence of hydrogen peroxide ($H_2O_2$), and (c) generating treated water on removal of dye. In some embodiments, the method is performed by using an ultrasonic irradiation process. The sonocatalyst composition is copper sulfide and cobalt ferrite ($Cu_2S/CoFe_2O_4$) nanocomposite material. In one embodiment, the dye wastewater is pre-sonicated with the sonocatalyst composition in 35 to 40 kHz frequency and 100 W output power. In some embodiments, the dye is removed from the dye wastewater within 2 to 20 mins. Further, the sonocatalyst composition is recycled and reused.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

Amongst the numerous techniques of dye removal treatment, ultrasonic oxidation process gives the best results as it can be used to remove different types of coloring materials. However, the application of ultrasound alone is inefficient for the degradation of the target organic pollutants, because this process requires more time and high amount of energy for an acceptable degradation of dyes.

Therefore, there exists a need for a novel nanocomposite composition for an efficient ultrasonic oxidation process for treating dye effluents or pollutants. There is also need for a composition that consumes less time, energy and allows easy retrieval of the catalyst from reaction mixture for subsequent uses.

The present invention generally relates to a composition for treating or degrading organic dye pollutants from industrial wastewater in short duration. Further, the present invention also relates to a method of synthesizing said composition for treating dye wastewater.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a composition for treating dye wastewater, is disclosed. In one embodiment, the composition is a catalyst composition used for ultrasound irradiation process. The composition according to the present invention, comprises a copper sulfide and cobalt ferrite ($Cu_2S/CoFe_2O_4$) nanocomposite material. In one embodiment, the composition further comprises hydrogen peroxide ($H_2O_2$). In one embodiment, the coercive force ($H_c$) of the nanocomposite material is 480 Oe. The saturation magnetization ($M_s$) of the nanocomposite material is 36.26 emu/g. Further, the remnant magnetization ($M_r$) of the nanocomposite material is 9.85 emu/g. In one embodiment, the nanocomposite material is a sonocatalyst. In one embodiment, the concentration of hydrogen peroxide ($H_2O_2$) ranges from 0 mM to 5 mM. In some embodiments, the optimum concentration of hydrogen peroxide ($H_2O_2$) is 4 mM.

Figure 1:
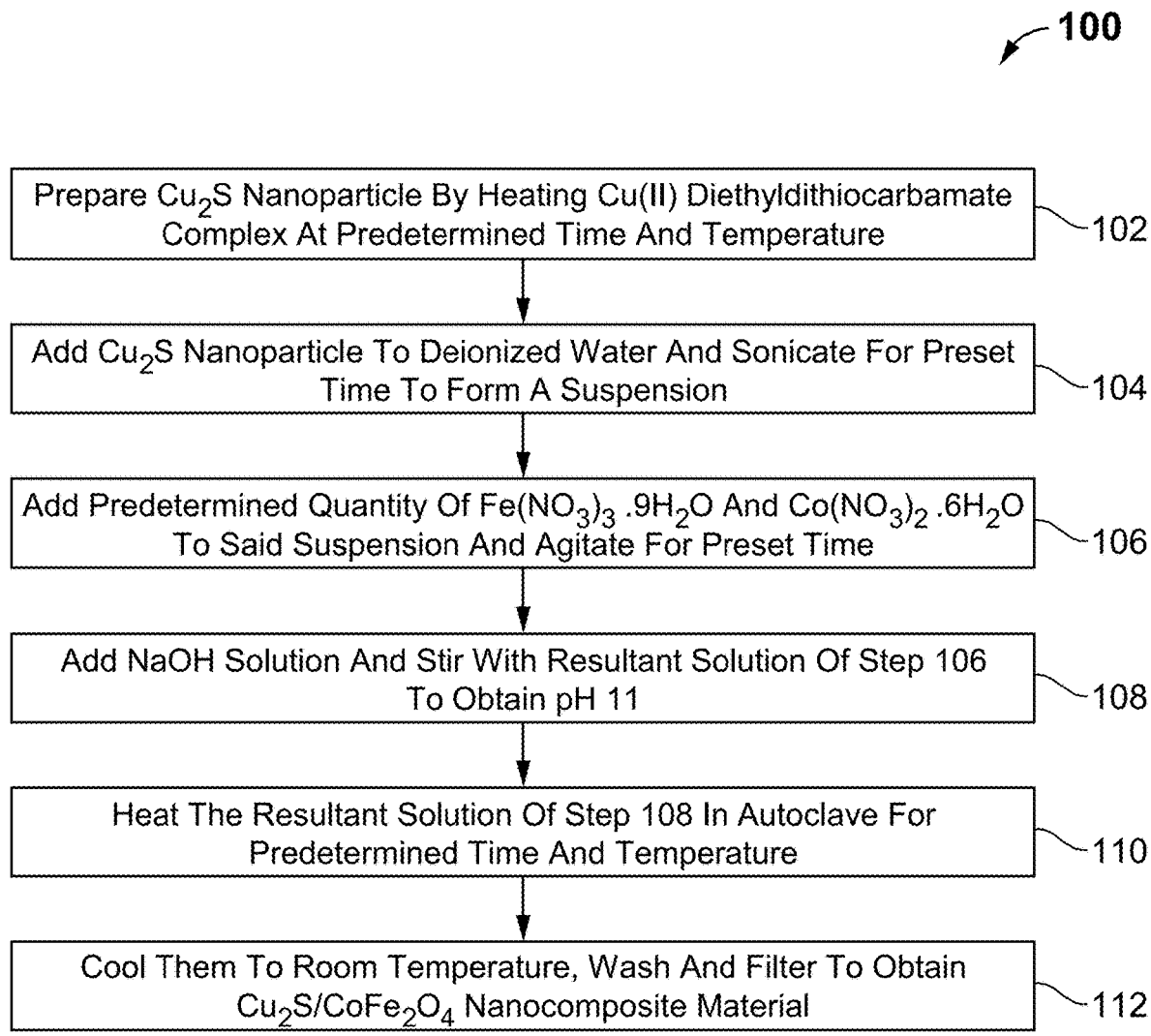
FIG. 1 exemplarily illustrates a method of synthesizing sonocatalyst copper sulfide and cobalt ferrite ($Cu_2S/CoFe_2O_4$) nanocomposite, according to an embodiment of the present invention.

Referring to FIG. 1, a method 100 of synthesizing a composition for treating dye wastewater, is disclosed. Said composition is synthesized by a simple hydrothermal method. The method 100 comprises the step of, preparing copper sulfide ($Cu_2S$) nanoparticle by heating Cu(II) diethyldithiocarbamate complex at predetermined time and temperature at step 102. At step 104, $Cu_2S$ nanoparticle is added in deionized water and sonicating them together for preset time to form a suspension. The method further includes, at step 106, a predetermined quantity of $Fe(NO_3)_3 \cdot 9H_2O$ and $Co(NO_3)_2 \cdot 6H_2O$ added to said suspension and agitate for preset time. At step 108, NaOH solution is added and stirred with resultant solution of step 106 to obtain pH 11. The method further includes, at step 110, the resultant solution of step 108 is heated for predetermined time and temperature. Finally, at step 112, the method includes, cooling the output nanoparticles of step 110 to room temperature, washing and filtering to obtain the sonocatalyst copper sulfide and cobalt ferrite ($Cu_2S/CoFe_2O_4$) nanocomposite material.

In one embodiment, the predetermined temperature for preparing copper sulfide ($Cu_2S$) nanoparticle at step 102 is 220° C. The predetermined time for preparing copper sulfide ($Cu_2S$) nanoparticle at step 102 is 0.5 h. Further, the $Cu_2S$ nanoparticle is sonicated in deionized water at step 104 for 1 h. In one embodiment, the predetermined quantity of $Fe(NO_3)_3 \cdot 9H_2O$ and $Co(NO_3)_2 \cdot 6H_2O$ is agitated with said suspension at step 106 for 1 h. In one embodiment, the resultant solution of step 108 is heated in an autoclave at 180° C. for 12 h. The autoclave could be a Teflon-lined stainless-steel autoclave.

Figure 2:
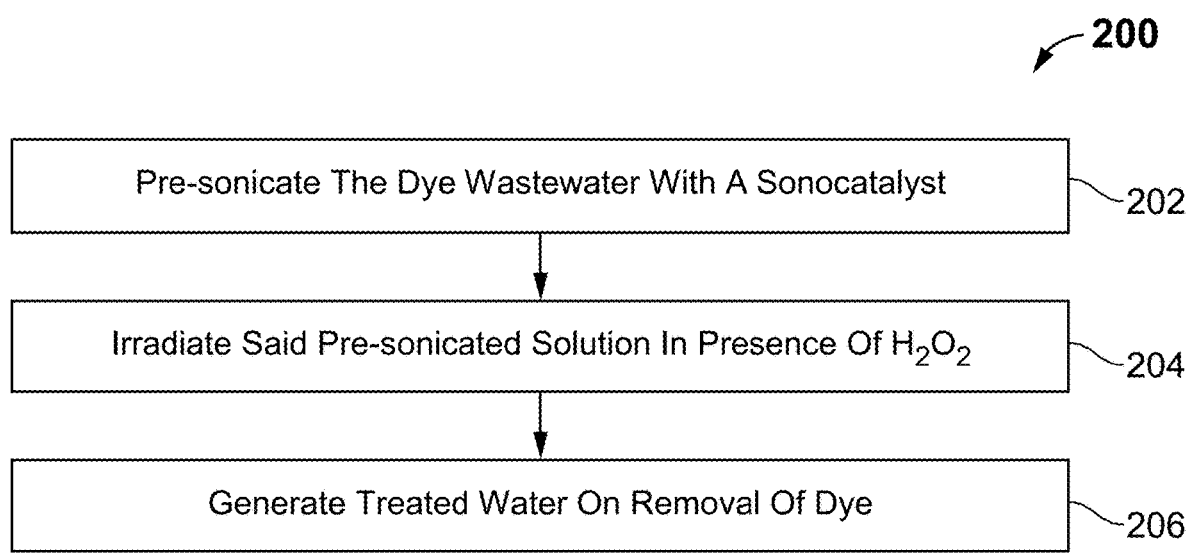
FIG. 2 exemplarily illustrates a method of treating dye wastewater using said sonocatalyst ($Cu_2S/CoFe_2O_4$) nanocomposite, according to an embodiment of the present invention.

FIG. 2 exemplarily illustrates a method 200 of treating dye wastewater using said sonocatalyst ($Cu_2S/CoFe_2O_4$) nanocomposite. In one embodiment, the method 200 of treating dye wastewater, comprising the steps of, pre-sonicating the dye wastewater with a sonocatalyst composition, at step 202. At step 204, the pre-sonicated solution is irradiated in presence of hydrogen peroxide ($H_2O_2$). The method 200 further includes, generating treated water after complete degradation of organic dye pollutants, at step 206.

In some embodiments, the method is performed by using an ultrasonic irradiation process. The sonocatalyst composition is copper sulfide and cobalt ferrite ($Cu_2S/CoFe_2O_4$) nanocomposite material. In one embodiment, the dye wastewater is pre-sonicated with the sonocatalyst composition in 35 to 40 kHz frequency and 100 W output power. In some embodiments, the dye is removed from the dye wastewater within 2 to 20 mins. Further, this ultrasound-assisted advanced oxidation process enables complete degradation of dyes including, methylene blue (MB), mRhodamine (RhB), and methyl orange (MO), in presence of $H_2O_2$ as a green oxidant after 2 mins.

In one embodiment, the degradation efficiency of methylene blue (MB) through $H_2O_2$/ultrasonic irradiation, and ultrasonic irradiation/$Cu_2S/CoFe_2O_4$ systems in 2 mins was 5% and 60%, respectively. In another embodiment, the combined use of ultrasonic irradiation, $H_2O_2$ and $Cu_2S/CoFe_2O_4$ nanocomposite enhanced the degradation efficiency of methylene blue (MB) from 68% to 100% within 2 mins. Herein, 4 mM concentration of hydrogen peroxide ($H_2O_2$) is used.

In one embodiment, the sonocatalyst is recycled and reused. The nanocomposite could be magnetically separated and reused without any changes in its structure for several consecutive runs of sonocatalytic dye degradation process. Significant loss of activity is not observed up to four catalytic cycles, which indicates the stability of the sonocatalyst, and efficiency for the degradation of organic dyes from the wastewater or effluents. Further, the magnetic properties of the sonocatalyst nanocomposite allow easy retrieval of the catalyst from the reaction mixture for subsequent uses.

By this invention, a novel, eco-friendly and economical method for the complete degradation of the organic dye pollutants from the industrial wastewater is achieved. Further, a novel magnetic copper sulfide and cobalt ferrite ($Cu_2S/CoFe_2O_4$) nanocomposite material is synthesized rapidly in ease, with low energy consumption. Further, the semiconductor-based sonocatalysis could overcome the disadvantages of existing photocatalytic technology because, the ultrasonic (US) wave has a strong penetrating ability for any dye concentration of water medium. Further, the sonocatalyst has enough stability, as its structure and degradation ability does not change even after multiple use. After completion of the process, the sonocatalyst could be separated and reused from a waste water system, without any need for complex separation process using a magnet.

The following examples are intended to illustrate certain embodiments of the present invention, but do not exemplify the full scope of the invention.

EXAMPLES

Example—1: Synthesis of Sonocatalyst Composition

Dye effluents discharged from many industries, like textile, are among the most adverse materials that should be removed and treated before entering to the surface waters and rivers. Different methods are used to remove such pollutants. Sonocatalysis process is one of the advanced oxidizing processes using a catalyst, which is an effective method for treating water. Herein, the catalyst or sonocatalyst is a new composite of $Cu_2S$ and ferrites that have a band gap, which enables degrading of dyes in presence of ultrasound and hydrogen peroxide ($H_2O_2$). Based on the displacement of band gap to the visible area, it proves an application in degrading organic dyes available in dye effluents. Copper sulfide and cobalt ferrite ($Cu_2S/CoFe_2O_4$) catalyst is a nanocomposite material characterized with magnetically recyclability characteristic for removing dye in presence of ultrasound.

Figure 3:
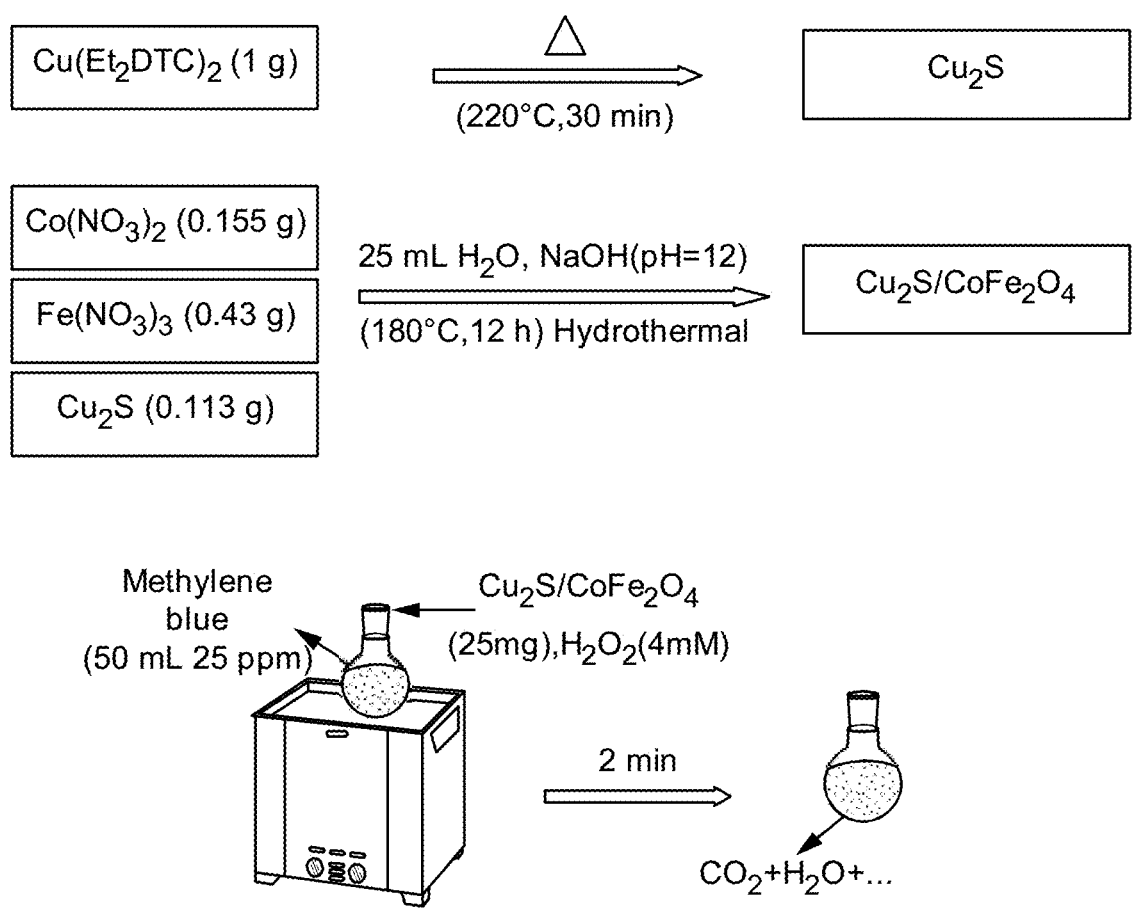
FIG. 3 exemplarily illustrates a laboratory synthesis process of $Cu_2S/CoFe_2O_4$ nanocomposite for degrading high concentration of dye pollutants.

FIG. 3 exemplarily illustrates a laboratory synthesis process of $Cu_2S/CoFe_2O_4$ nanocomposite for degrading high concentration of dye pollutants. In order to prepare $Cu_2S$ nanoparticles, 2 g of the Cu(II) diethyldithiocarbamate complex was placed in a porcelain crucible and then heated in an electric furnace at 22° C. for 0.5 h in air. For synthesizing the magnetic $Cu_2S/CoFe_2O_4$ nanohybrid with uniform dispersion, 0.113 g of $Cu_2S$ nanoparticles was applied into 25 ml deionized water and sonicated for 1 h. Then, 0.43 g of $Fe(NO_3)_3.9H_2O$ and 0.15 g of $Co(NO_3)_2.6H_2O$ were added into the suspension and stirred for 1 h. After that, the mixture with pH of 11 obtained by adding NaOH solution (6 M) was re-stirred for 1 h and left in a 50 mL Teflon-lined stainless-steel autoclave for 12 h under auto-generated pressure at 180° C. Finally, it was cooled down to the room temperature and the final yield was filtered after washing with water.

Example—2: Physical Characterization—XRD Analysis

Figure 4:
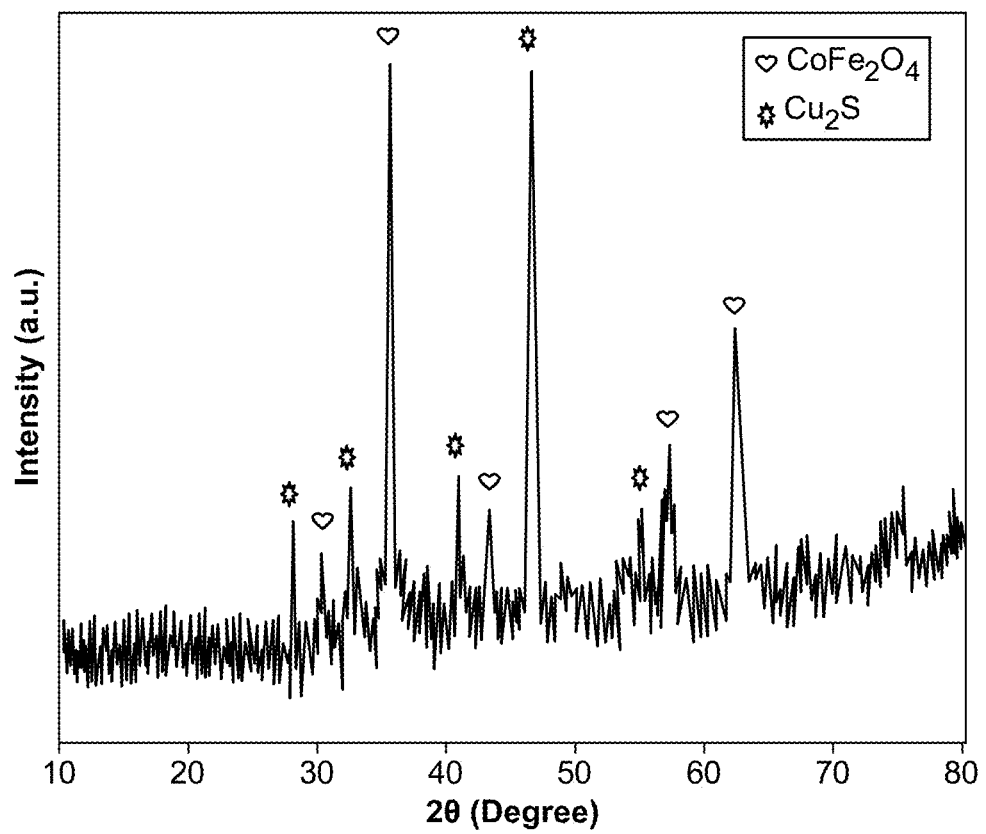
FIG. 4 exemplarily illustrates XRD pattern of $Cu_2S/CoFe_2O_4$ nanocomposite.

XRD diffraction pattern of $Cu_2S/CoFe_2O_4$ nanostructure are presented in FIG. 4. The XRD diffraction pattern exhibits diffraction peaks of both $Cu_2S$ and $CoFe_2O_4$. Diffraction peaks related to the impurities were not observed in the patterns, confirming the high purity of the synthesized product. The diffraction peaks were widened due to small size effect of the $Cu_2S/CoFe_2O_4$ nanocomposite.

Example—3: FT-IR Spectrum Analysis

Figure 5:
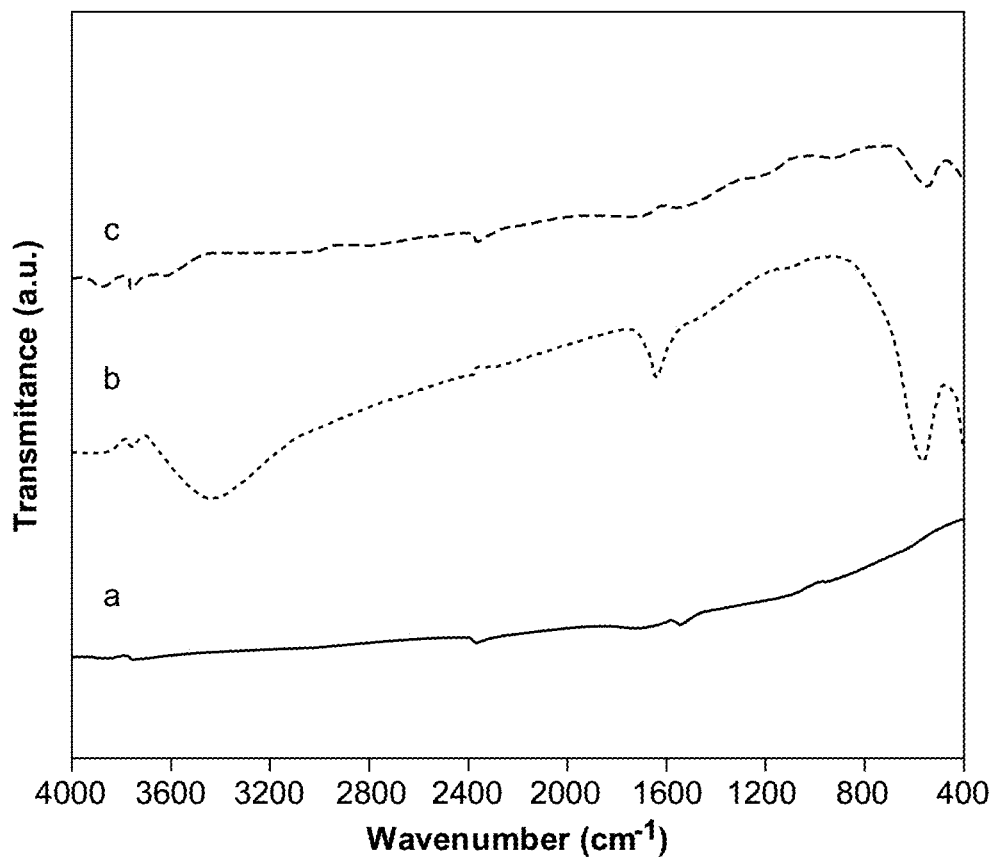
FIG. 5 exemplarily illustrates FT-IR spectra of (a) $Cu_2S$, (b) $CoFe_2O_4$, and (c) $Cu_2S/CoFe_2O_4$.
Figures 6A, 6B:
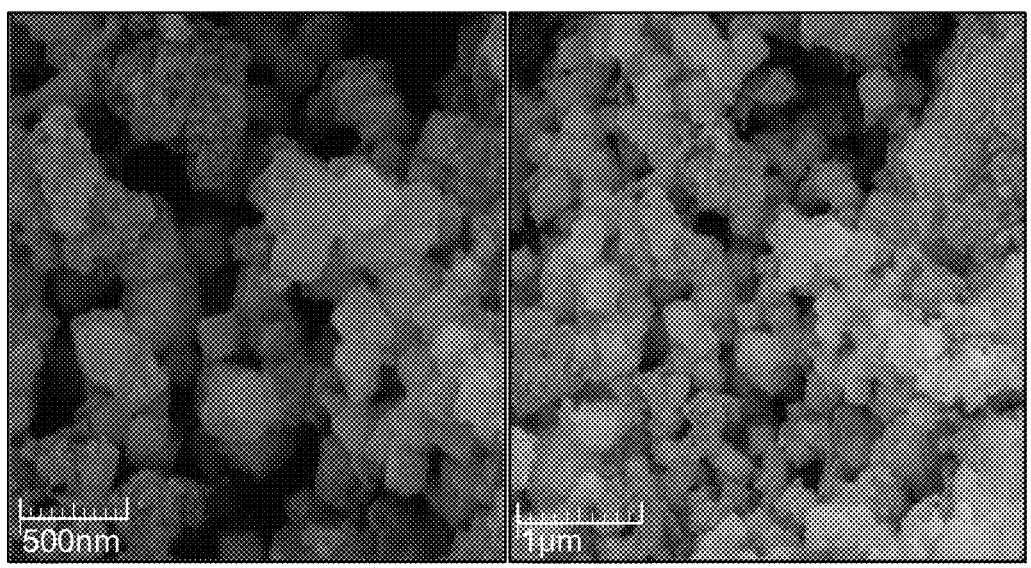
FIG. 6A exemplarily illustrates SEM images of $Cu_2S/CoFe_2O_4$ nanocomposite at 500 nm.
FIG. 6B exemplarily illustrates SEM images of $Cu_2S/CoFe_2O_4$ nanocomposite at 1 µm.

By FT-IR spectroscopy, FT-IR spectrum of the $Cu_2S$ and $CoFe_2O_4$ nanocomposite was recorded. In FT-IR spectrum of the $Cu_2S$ nanoparticles as shown in FIG. 5, no band was observed due to the stretching and bending vibrations of (a) Cu—S appeared below 400 $cm^{-1}$. FIG. 5 shows the FT-IR spectrum of (b) pure $CoFe_2O_4$, which displayed two principal absorption bands below 1000 $cm^{-1}$, a characteristic feature of all ferrites. FIG. 5 shows the FT-IR spectrum of the (c) $Cu_2S/CoFe_2O_4$ nanocomposite, which displayed two main absorption bands below 1000 $cm^{-1}$. These bands could be related to the $CoFe_2O_4$ nanoparticles in the nanocomposite. XRD and FT-IR results confirms that the $Cu_2S/CoFe_2O_4$ composite was synthesized hydrothermally completely and pure. Therefore, the morphology and structure of the product were surveyed using SEM. The SEM images show nanocomposite has cubes of $Cu_2S$ nanoparticles covered by $CoFe_2O_4$ nanoparticles, as shown in FIG. 6A and FIG. 6B.

Example—4: X-Ray Spectroscopy Analysis

Figure 7A:
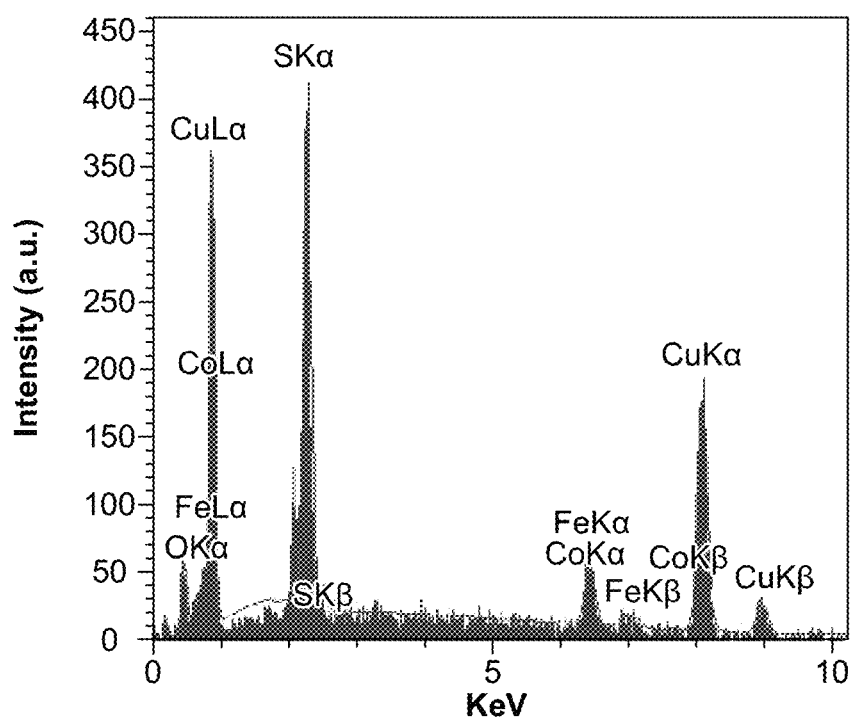
FIG. 7A exemplarily illustrates EDX analysis of $Cu_2S/CoFe_2O_4$ nanocomposite.
Figure 7B:
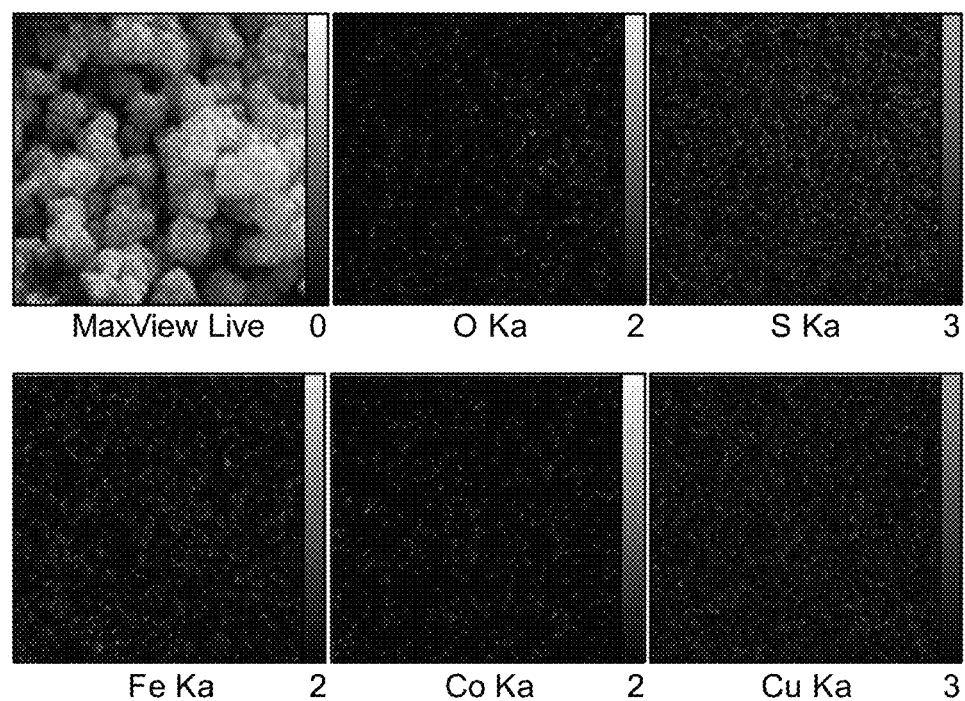
FIG. 7B exemplarily illustrates EDX mapping elemental image of the $Cu_2S/CoFe_2O_4$ nanocomposite.

Further investigation was carried out by energy dispersive X-ray spectroscopy (EDX) to characterize the elemental composition of the $Cu_2S/CoFe_2O_4$ nanocomposite. The presence of Fe, O, Co, Cu and S elements in the nanocomposite can be proved by the EDX elemental spectrum, as shown in FIG. 7A and the corresponding elemental mappings distribution in FIG. 7B shows the uniform distribution of these elements in the nanocomposite.

Example—5: Vibrating Sample Magnetometer (VSM) Analysis

Figure 8A:
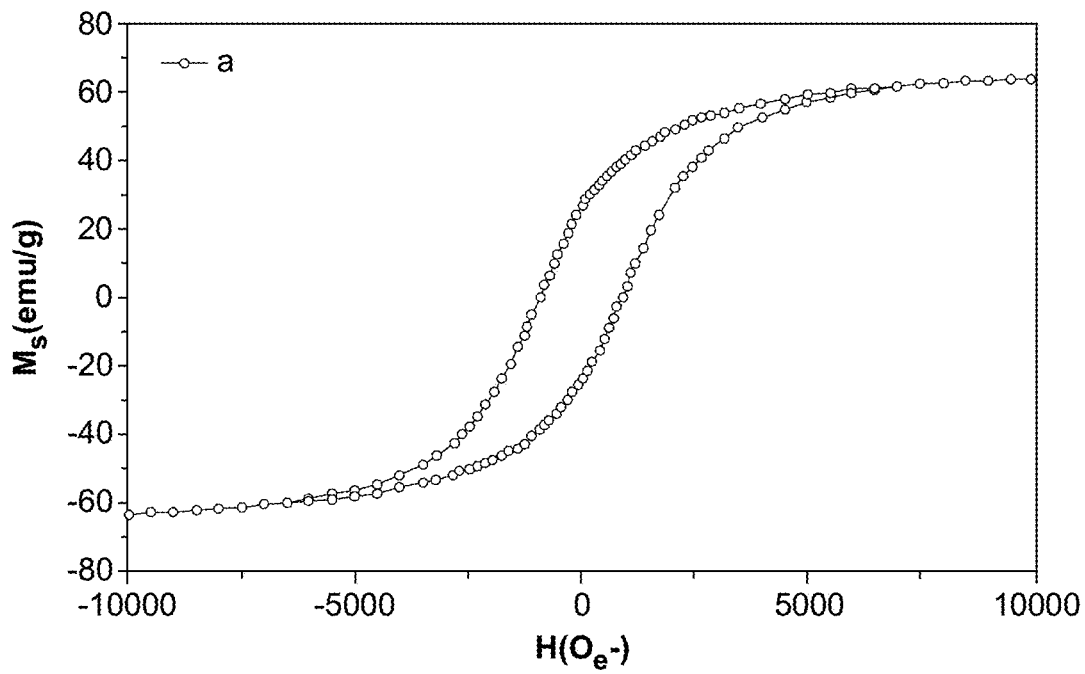
FIG. 8A exemplarily illustrates room-temperature magnetization curves of $CoFe_2O_4$.
Figure 8B:
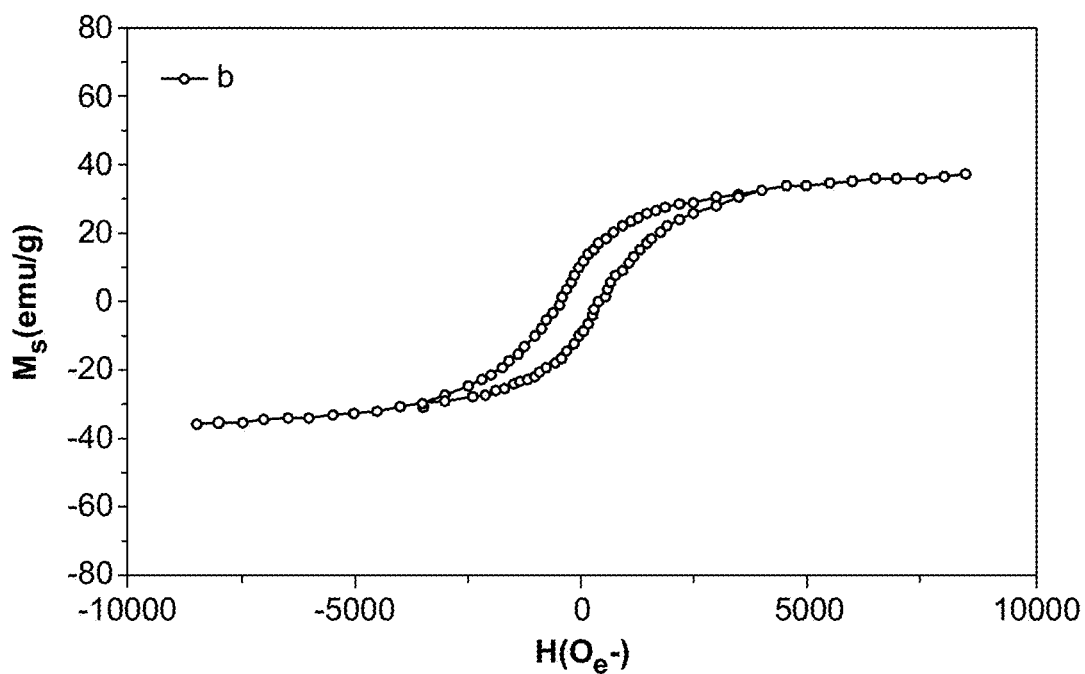
FIG. 8B exemplarily illustrates room-temperature magnetization curves of $Cu_2S/CoFe_2O_4$.

The magnetic properties of the pure $CoFe_2O_4$ nanoparticles and $Cu_2S/CoFe_2O_4$ nanocomposite were studied by vibrating sample magnetometer (VSM) at room temperature. As shown in FIG. 8A and FIG. 8B, the nanocomposite displayed a ferromagnetic behavior. The nanocomposite of $Cu_2S/CoFe_2O_4$ gives the coercive force ($H_c$), saturation magnetization ($M_s$) and remnant magnetization ($M_r$) of 480 Oe, 36.26 emu/g and 9.85 emu/g, respectively. These values were less than that of pure $CoFe_2O_4$ (Hc: 898.26 Oe, Ms: 62.78 emu/g and Mr: 25.9 emu/g). However, Hc, Ms and Mr values of $Cu_2S/CoFe_2O_4$ were less than those of $CoFe_2O_4$ due to the presence of non-magnetic $Cu_2S$.

Example—6: Absorption Spectroscopy Analysis

Figure 9:
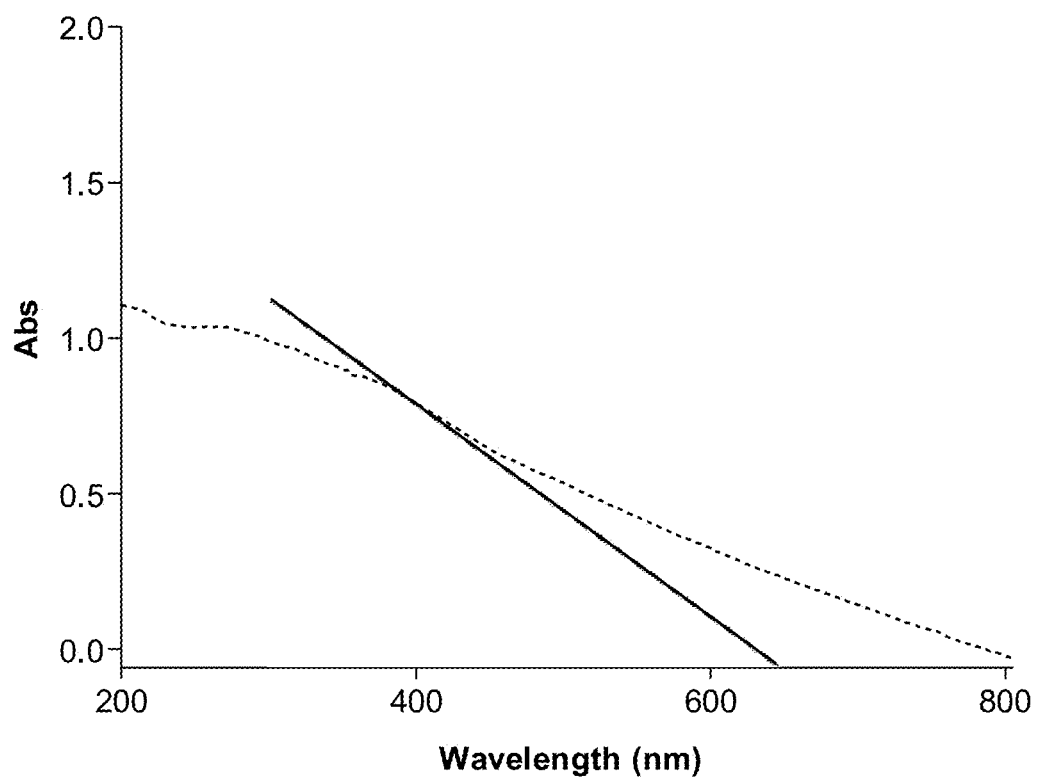
FIG. 9 exemplarily illustrates UV-Visible absorbance spectrum of the $Cu_2S/CoFe_2O_4$ nanocomposite.

FIG. 9 shows the absorption spectrum of the $Cu_2S/CoFe_2O_4$ nanocomposite dispersed in distilled water. This spectrum exhibits defined absorption edge at 630 nm, corresponding to energy gap of 1.96 for the $Cu_2S/CoFe_2O_4$ nanocomposite.

Example—7: Treatment of Dye Wastewater

Figure 10:
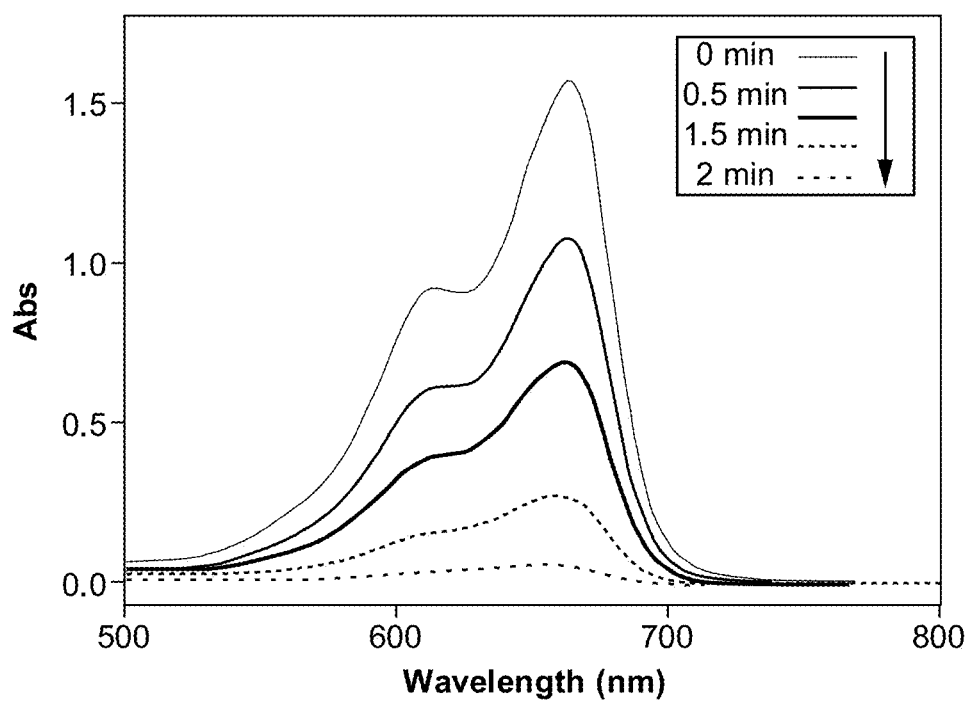
FIG. 10 exemplarily illustrates UV-visible spectral changes of methylene blue (MB) aqueous solution over $Cu_2S/CoFe_2O_4$, hydrogen peroxide ($H_2O_2$), and ultrasound irradiation.

Degradation of dyes in aqueous solutions was investigated in the presence of the $Cu_2S/CoFe_2O_4$ nanocomposite using ultrasonic bath. In a typical manner, 50 ml of methylene blue (MB) solution with initial concentration of 25 mg/L containing 25 mg sonocatalyst was sonicated with a frequency of 37 kHz and 100 (W) output power. Before ultrasonic irradiation, the above solution was stirred for 30 min in the dark to achieve adsorption-desorption equilibrium between the dye and sonocatalyst. Then, it was ultrasonic irradiated in the presence of $H_2O_2$ (4 mM). FIG. 10 shows the UV-Vis absorbance and color changes of MB aqueous solution in the presence of the $Cu_2S/CoFe_2O_4$ and $H_2O_2$ under ultrasonic irradiation. From the figure, the intensity of absorption band at 664 nm decreased and disappeared within 2 min.

The efficiency of ultrasonic irradiation, $Cu_2S/CoFe_2O_4/H_2O_2$, $H_2O_2$/ultrasonic irradiation and $Cu_2S/CoFe_2O_4$/ultrasonic irradiation systems for degradation of MB were evaluated in control experiments. The ability of ultrasonic irradiation alone and $Cu_2S/CoFe_2O_4/H_2O_2$ system for degrading MB within 2 min were negligible. However, the degradation efficiency of MB through $H_2O_2$/ultrasonic irradiation and ultrasonic irradiation/$Cu_2S/CoFe_2O_4$ systems with 2 min was 5% and 60%, respectively. The above results confirmed that the combined use of ultrasonic irradiation, $H_2O_2$ and $Cu_2S/CoFe_2O_4$ nanocomposite is necessary to achieve fast and complete degradation of the dyes.

Figure 11:
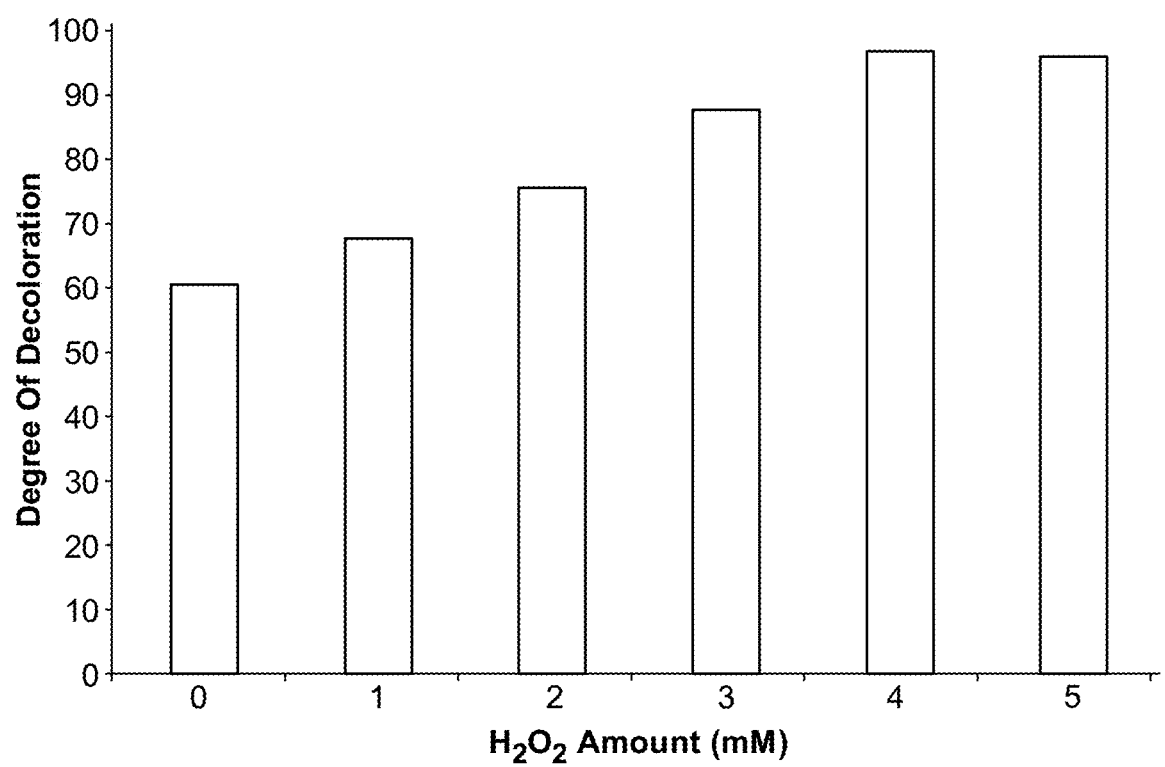
FIG. 11 exemplarily illustrates influence of $H_2O_2$ concentration on the sonocatalytic degradation of MB.

To obtain the optimum concentration of $H_2O_2$ for degradation of MB in $Cu_2S/CoFe_2O_4/H_2O_2$/ultrasonic irradiation process, six scenarios were developed and tested with different concentrations of $H_2O_2$ varying from 0 to 5 mM. Based on the results depicted in FIG. 11, 60% of MB was removed in the absence of $H_2O_2$ within 2 mins. By enhancing the concentration of $H_2O_2$ in the ultrasound degradation experiments from 1 to 4 mM, the MB removal efficiency was enhanced from 68% to 100% within 2 mins. Herein, 4 mM was chosen as the optimum concentration of $H_2O_2$ for degradation.

Figure 12:
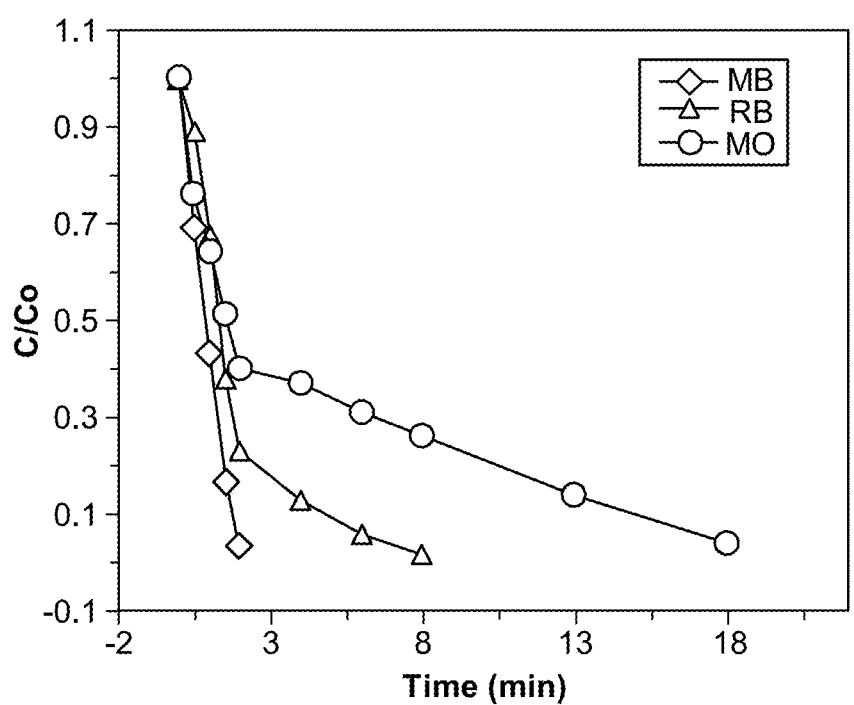
FIG. 12 exemplarily illustrates comparison of change in concentration of MB, rhodamine B (RB) and methyl orange (MO) ($C/C_0$) as a function of irradiation time for the sonocatalyst.

Subsequently, the degradation of other organic dyes in aqueous solution including MO and Rhodamine B (RhB) was also studied to verify the generality of the sonocatalytic system using the synthesized $Cu_2S/CoFe_2O_4$ nanocomposite. As observed from FIG. 12, complete degradation (100%) of both RhB and MO was achieved within 8 and 18 min. From the results, the sonocatalyst acted differently in sonocatalytic degradation of the studied dyes, mainly due to their different chemical structure, sizes, compositions and electric charges.

Example—8: Sonocatalytic Degradation Mechanism

Basically, ultrasonic irradiation forms high wavelength light that excites the catalyst to generate electron-hole pairs and hydroxyl radicals on its surface according to the sonoluminescence mechanism. Collapsing cavity bubbles in the solution creates high-temperature "hot spots" that accelerate the pyrolysis of $H_2O_2$ to produce hydroxyl radicals (.OH) on the surface of the catalyst. Similar to light, "hot spots" and their heat energies could also excite the $Cu_2S/CoFe_2O_4$ nanocomposite. The conduction band (CB) and valence band (VB) potentials of $Cu_2S$ and $CoFe_2O_4$ were calculated for band structure perception of $Cu_2S/CoFe_2O_4$ nanocomposite using the following equation:

$$EVB = X - E_e + 0.5E_g$$

$$ECB = EVB - E_g$$

Figure 13:
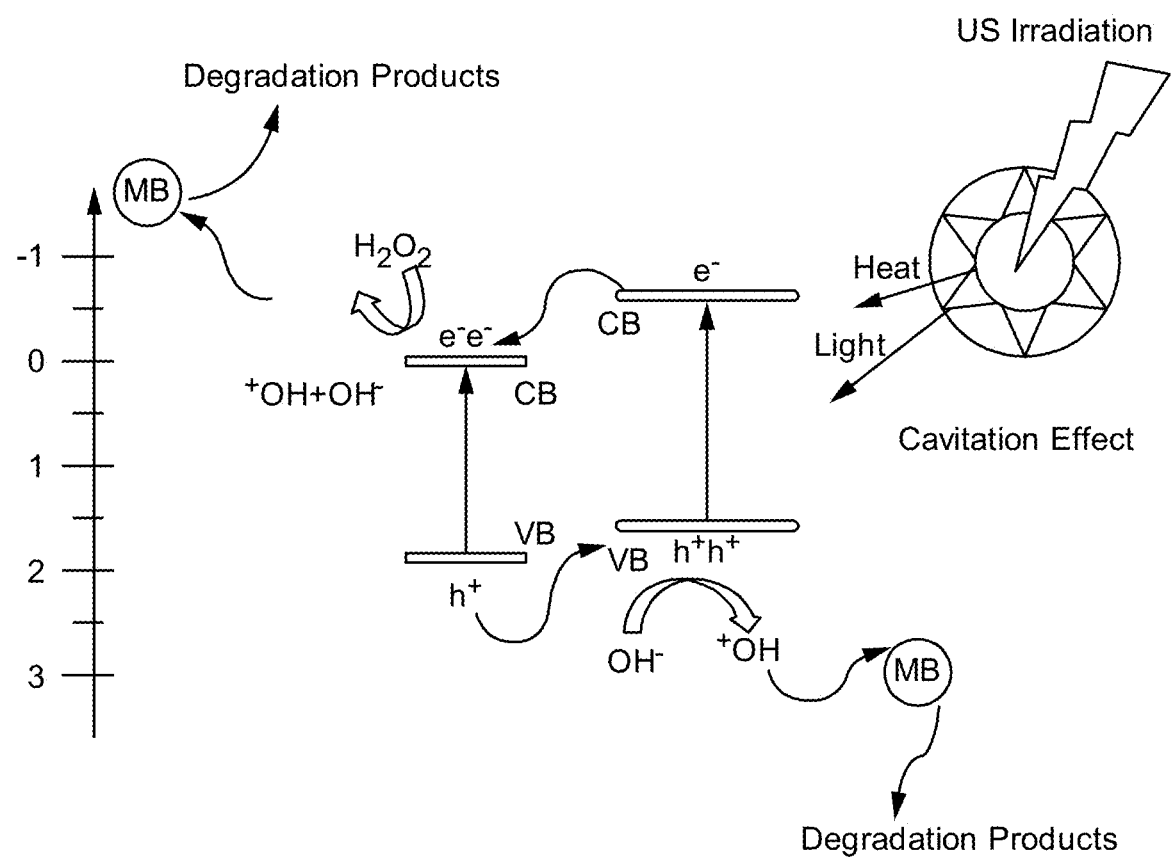
FIG. 13 exemplarily illustrates schematic of separating generated electrons and holes on the interface of $Cu_2S/CoFe_2O_4$ nanocomposite under ultrasonic irradiation, and FIG. 14 exemplarily illustrates recyclability of $Cu_2S/CoFe_2O_4$ nanocomposite.

$E_e$ is the energy of free electrons on the hydrogen scale (4.5 eV), X is the electronegativity of the semiconductor, $E_g$ is the band gap energy of the semiconductor, EVB and ECB are the valance and conduction potentials. Since, the absolute electronegativity of $Cu_2S$ is 4.99 eV, then its VB and CB were calculated 1.59 and −0.61 eV, respectively. Furthermore, for the absolute electronegativity of $CoFe_2O_4$ (5.47 eV), VB and CB were respectively calculated (1.93 eV and 0.01 eV). In an instance, $Cu_2S$ has more negative CB potential than $CoFe_2O_4$, therefore, the injection of excited-state electrons in CB of $Cu_2S$ into CB of $CoFe_2O_4$ could be occurred under the influence of the generated light and heat. In another instance, the VB potential of $CoFe_2O_4$ (EVB=1.93 eV) is more positive than the VB potential of $Cu_2S$ (EVB=1.59 eV), indicating that the photogenerated holes on the $CoFe_2O_4$ could transfer into VB of $Cu_2S$ and then oxidize $OH^-$ into .OH, as shown in FIG. 13. Concurrently, the sonogenerated holes in valance band (VB) of $CoFe_2O_4$ could be easily transferred to the VB of $Cu_2S$ and oxidize OH— (or $H_2O_2$ molecules) adsorbed on the surface of $Cu_2S$ particles to form .OH, as shown in FIG. 13. The .OH radicals show strong oxidation activity participating in the sonodegradation reactions. Also, some of holes maybe directly involved in the oxidation of methylene blue (MB) to produce unstable $MB^+$ as a target of $OH^-$ attack leading to $MB.^+$ as a better target for .OH.

$$H^+ + OH^- \rightarrow .OH \tag{4}$$

$$MB + h^+ \rightarrow MB^+ \text{(unstable)} \tag{5}$$

$$MB.^+ + .OH \rightarrow CO_2 + H_2O \tag{6}$$

Figure 14:
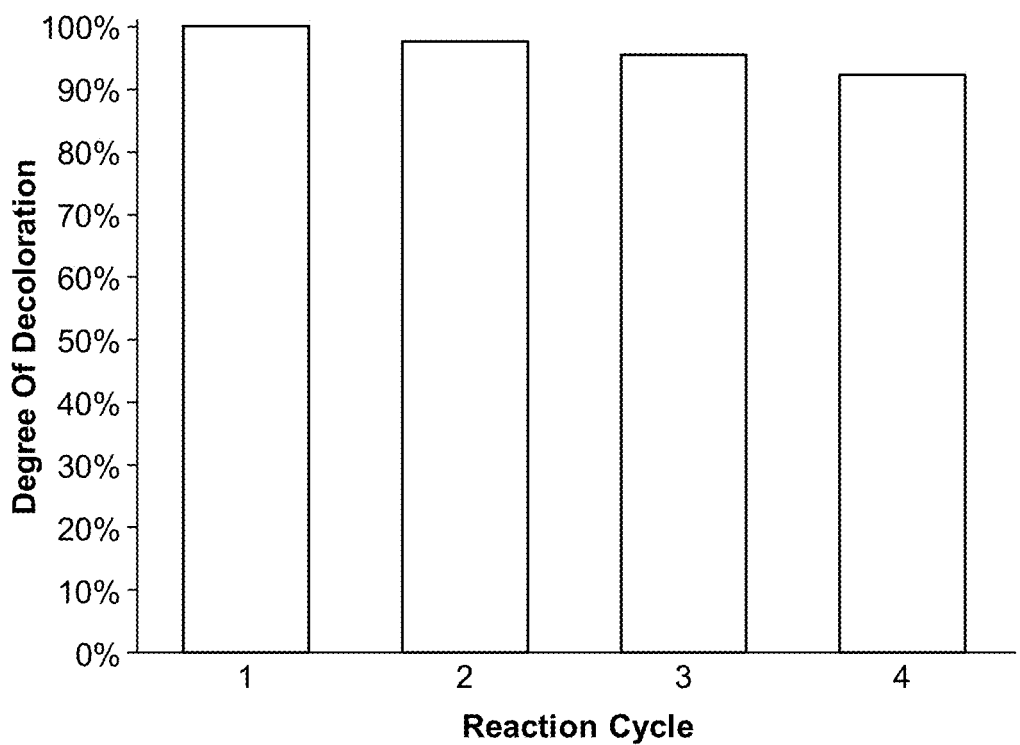

On the other hand, the produced hydroxyl radicals (.OH) resulting from reaction of the electrons in CB with $H_2O_2$ were active enough to degrade MB to the innocent products ($CO_2$, $H_2O$. etc.). The simplified mechanism of MB sonocatalytic degradation over $Cu_2S/CoFe_2O_4$ sonocatalyst is illustrated in FIG. 13. The reusability of the sonocatalytic was also tested upon the separation of the sonocatalyst magnetically and then performance of the sonocatalysis for multiple cycles, as shown in FIG. 14. Any significant loss of activity is not observed up to four catalytic cycles, which indicated that as-prepared magnetic sonocatalyst was stable and very effective for the degradation of organic dyes from water.

One aspect of the present disclosure is directed to a composition for treating dye wastewater, comprising a copper sulfide and cobalt ferrite ($Cu_2S/CoFe_2O_4$) nanocomposite material. In one embodiment, the composition further comprises hydrogen peroxide ($H_2O_2$). In a related embodiment, the concentration of hydrogen peroxide ($H_2O_2$) ranges from 0 mM to 5 mM. In another related embodiment, the optimum concentration of hydrogen peroxide ($H_2O_2$) is 4 mM. In one embodiment, the coercive force ($H_c$) of the nanocomposite material is 480 Oe. In another embodiment, the saturation magnetization ($M_s$) of the nanocomposite material is 36.26 emu/g. In one embodiment, the remnant magnetization ($M_r$) of the nanocomposite material is 9.85 emu/g. In one embodiment, said nanocomposite material is a sonocatalyst.

Another aspect of the present disclosure is directed to a method of synthesizing a composition for treating dye wastewater, comprising the step of: a) preparing copper sulfide ($Cu_2S$) nanoparticle by heating Cu(II) diethyldithiocarbamate complex at predetermined time and temperature; b) adding $Cu_2S$ nanoparticle in deionized water and sonicating them together for preset time to form a suspension; c) adding predetermined quantity of $Fe(NO_3)_3 \cdot 9H_2O$ and $Co(NO_3)_2 \cdot 6H_2O$ to said suspension and agitate for preset time; d) adding NaOH solution and stir with resultant solution of step (c) to obtain pH 11; e) heating the resultant solution of step (d) for predetermined time and temperature, and f) cooling the output nanoparticles of step (e) to room temperature, washing and filtering to obtain the sonocatalyst copper sulfide and cobalt ferrite ($Cu_2S/CoFe_2O_4$) nanocomposite material.

In one embodiment, the predetermined temperature for preparing copper sulfide ($Cu_2S$) nanoparticle at step (a) is 220° C. In another embodiment, the predetermined time for preparing copper sulfide ($Cu_2S$) nanoparticle at step (a) is 0.5 h. In one embodiment, the $Cu_2S$ nanoparticle is sonicated in deionized water at step (b) for 1 h. In another embodiment, the predetermined quantity of $Fe(NO_3)_3 \cdot 9H_2O$ and $Co(NO_3)_2 \cdot 6H_2O$ is agitated with said suspension at step (c) for 1 h. In one embodiment, the resultant solution of step (d) is heated in autoclave at 180° C. for 12 h.

Another aspect of the present disclosure is directed to a method of treating dye wastewater, comprising the steps of: (a) pre-sonicating the dye wastewater with a sonocatalyst composition; (b) irradiating the pre-sonicated solution in presence of hydrogen peroxide ($H_2O_2$), and (c) generating treated water on removal of dye. In one embodiment, the method is an ultrasonic irradiation process. In another embodiment, the sonocatalyst composition is copper sulfide and cobalt ferrite ($Cu_2S/CoFe_2O_4$) nanocomposite material. In one embodiment, the dye wastewater is pre-sonicated with the sonocatalyst composition in 35 to 40 kHz frequency and 100 W output power. In another embodiment, the dye is removed within 2 to 20 mins. In one embodiment, the sonocatalyst composition is recycled and reused.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. A method of synthesizing a composition for treating dye wastewater, comprising the step of:
    a) preparing copper sulfide ($Cu_2S$) nanoparticle by heating Cu(II) diethyldithiocarbamate complex at predetermined time and temperature;
    b) adding $Cu_2S$ nanoparticle in deionized water and sonicating them together for preset time to form a suspension;
    c) adding predetermined quantity of $Fe(NO_3)_3 \cdot 9H_2O$ and $Co(NO_3)_2 \cdot 6H_2O$ to said suspension and agitate for preset time;
    d) adding NaOH solution and stir with resultant solution of step (c) to obtain pH 11;
    e) heating the resultant solution of step (d) for predetermined time and temperature, and
    f) cooling the output nanoparticles of step (e) to room temperature, washing and filtering to obtain the sonocatalyst copper sulfide and cobalt ferrite ($Cu_2S/CoFe_2O_4$) nanocomposite material.

2. The method of claim 1, wherein the predetermined temperature for preparing copper sulfide ($Cu_2S$) nanoparticle at step (a) is 220° C.

3. The method of claim 1, wherein the predetermined time for preparing copper sulfide ($Cu_2S$) nanoparticle at step (a) is 0.5 h.

4. The method of claim 1, wherein the $Cu_2S$ nanoparticle is sonicated in deionized water at step (b) for 1 h.

5. The method of claim 1, wherein the predetermined quantity of $Fe(NO_3)_3 \cdot 9H_2O$ and $Co(NO_3)_2 \cdot 6H_2O$ is agitated with said suspension at step (c) for 1 h.

6. The method of claim 1, wherein the resultant solution of step (d) is heated in autoclave at 180° C. for 12 h.

* * * * *